United States Patent [19]

Muraishi

[11] Patent Number: 4,945,238

[45] Date of Patent: Jul. 31, 1990

[54] APPARATUS FOR LOADING SHEET-SHAPED MATERIAL

[75] Inventor: Katsuaki Muraishi, Kanagawa, Japan

[73] Assignee: Fuji Photo Film Co., Ltd., Kanagawa, Japan

[21] Appl. No.: 371,905

[22] Filed: Jun. 27, 1989

Related U.S. Application Data

[63] Continuation-in-part of Ser. No. 221,491, Jul. 19, 1988, abandoned.

[30] Foreign Application Priority Data

Jul. 20, 1987 [JP] Japan .................. 62-180777

[51] Int. Cl.$^5$ ............................................. G03B 42/00
[52] U.S. Cl. ............................ 250/327.2; 271/243; 271/245; 271/276
[58] Field of Search ............... 250/484.1 B, 327.2 D, 250/327.2 J; 271/243, 245, 276

[56] References Cited

U.S. PATENT DOCUMENTS

| | | | |
|---|---|---|---|
| 4,236,078 | 11/1980 | Kotera et al. | 250/363 R |
| 4,239,968 | 12/1980 | Kotera et al. | 250/327.2 |
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 382/6 |
| 4,387,428 | 6/1983 | Ishida et al. | 364/413.13 |
| 4,750,045 | 6/1988 | Ohara et al. | 358/285 |
| 4,816,923 | 3/1989 | Saotome | 358/489 |

FOREIGN PATENT DOCUMENTS

| | | | |
|---|---|---|---|
| 56-11395 | 2/1981 | Japan | 250/327.2 |
| 399396 | 2/1974 | U.S.S.R. | 271/245 |

OTHER PUBLICATIONS

N. K. Arter, W. C. Dodt and R. D. Klein, "Paper Gate Holding Current," IBM Technical Disclosure Bulletin vol. 23, No. 1 (June 1980) pp. 72–73.

*Primary Examiner*—Constantine Hannaher
*Attorney, Agent, or Firm*—Sughrue, Mion, Zinn, Macpeak & Seas

[57] ABSTRACT

An apparatus for loading a sheet-shaped material comprises a sheet holding device capable of holding a sheet-shaped material at a predetermined position on an inwardly concave curved surface, and a sheet conveyor provided at an end portion of the sheet holding device for grasping the sheet-shaped material and conveying it to the predetermined position along the curved surface of the sheet holding device. A claw is connected with an urging member, and projected to a position on the curved surface at which a leading edge of the sheet-shaped material conveyed by the sheet conveyor contacts the claw. The claw is moveable on the curved surface against urging force of the urging member as the leading edge of the sheet-shaped material contacts the claw.

3 Claims, 5 Drawing Sheets

APPARATUS FOR LOADING SHEET-SHAPED MATERIAL

This application is a continuation-in-part application of Application Ser. No. 221,491 filed July 19, 1988 now abandoned.

BACKGROUND OF THE INVENTION

1. Field of the Invention

This invention relates to an apparatus for loading a sheet-shaped material onto an inwardly concave curved surface. This invention particularly relates to an apparatus for loading a sheet-shaped material which carries out the loading by a simple mechanism.

2. Description of the Prior Art

Various sheet-shaped materials have heretofore been used for carrying out, for example, image read-out and recording in light beam scanning apparatuses such as light beam scanning read-out apparatuses and light beam scanning recording apparatuses. Also, as one of the sheet-shaped materials capable of recording image information thereon and subjected to the image read-out in the light beam scanning read-out apparatuses, there has heretofore been known a stimulable phosphor sheet as disclosed in, for example, U.S. Pat. Nos. 4,236,078, 4,239,968, 4,258,264, 4,276,473, 4,315,318 and 4,387,428 and Japanese Unexamined Pat. Publication No. 56(1981)-11395.

Specifically, when certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor. The term "stimulable phosphor sheet" as used herein means a sheet-shaped recording material composed of the stimulable phosphor. In general, the stimulable phosphor sheet is composed of a substrate and a layer of the stimulable phosphor overlaid on the substrate. The stimulable phosphor layer comprises a binder and the stimulable phosphor dispersed therein. In the case where the stimulable phosphor layer is self-supporting, the stimulable phosphor layer itself can constitute the stimulable phosphor sheet.

On the other hand, in the aforesaid light beam scanning apparatuses and the like, it is often necessary to hold the sheet-shaped material along an inwardly concave curved surface such as a cylindrical surface for various purposes. For example, a light beam scanning apparatus is disclosed in Japanese Unexamined Pat. Publication No. 62(1987)-92572 wherein a light beam scanning system is accommodated in a cylindrical optical unit, a semi-cylindrical holding means surrounds the optical unit, and a scanning sheet which is to be scanned is fed by feed rollers from one end of the holding means along the inner surface of the holding means and disposed on the holding means. In the disclosed light beam scanning apparatus, the optical unit provided with a light deflector for scanning in the main scanning direction deflects scanning light in the main scanning direction and, at the same time, is rotated in the sub-scanning direction with respect to the scanning sheet secured to the holding means, thereby to carry out two-dimensional scanning. With this technique, the apparatus as a whole can be made smaller than in the case where the scanning in the sub-scanning direction is carried out by conveying the scanning sheet.

In the apparatus for scanning by securing the sheet-shaped material to the holding means, it is necessary for the sheet-shaped material to be secured reliably along the inwardly concave curved surface of the holding means. However, in the case where the sheet-shaped material is the stimulable phosphor sheet by way of example, the stimulable phosphor sheet is comparatively rigid and therefore often separates from the curved surface. Thus a need exists for an apparatus for loading a sheet-shaped material such that a comparatively rigid sheet-shaped material such as the stimulable phosphor sheet is loaded onto a curved surface such as a cylindrical surface reliably without separation from the curved surface.

SUMMARY OF THE INVENTION

The primary object of the present invention is to provide an apparatus for loading a sheet-shaped material which reliably holds a sheet-shaped material along an inwardly concave curved surface by a simple mechanism.

Another object of the present invention is to provide an apparatus for loading a sheet-shaped material which is suitable for use in a light beam scanning apparatus or the like wherein a sheet-shaped material should be secured at a high positioning accuracy.

The present invention provides an apparatus for loading a sheet-shaped material, which comprises:

(i) a sheet holding means capable of holding a sheet-shaped material at a predetermined position on an inwardly concave curved surface, (ii) a sheet conveyance means provided at an end portion of said sheet holding means for grasping said sheet-shaped material and conveying it to said predetermined position along said curved surface of said sheet holding means, and (iii) a claw connected with an urging means, projected to a position on said curved surface at which a leading edge of said sheet-shaped material conveyed by said sheet conveyance means contacts said claw, and moveable on said curved surface against urging force of said urging means as the leading edge of said sheet-shaped material contacts said claw.

With the apparatus for loading a sheet-shaped material in accordance with the present invention wherein the claw is connected with the urging means and the sheet-shaped material is conveyed along the curved surface with the leading edge of the sheet-shaped material receiving the pushing force of the claw reverse to the direction of conveyance of the sheet-shaped material, the sheet-shaped material does not separate by its rigidity from the curved surface and can be conveyed and held reliably in the form bent by the claw along the curved surface. Therefore, the apparatus for loading a sheet-shaped material in accordance with the present invention is suitable for use in a light beam scanning apparatus or the like wherein the sheet-shaped material should be secured at a high positioning

DESCRIPTION OF THE PREFERRED EMBODIMENTS

The present invention will hereinbelow be described in further detail with reference to the accompanying drawings.

Figure 1:
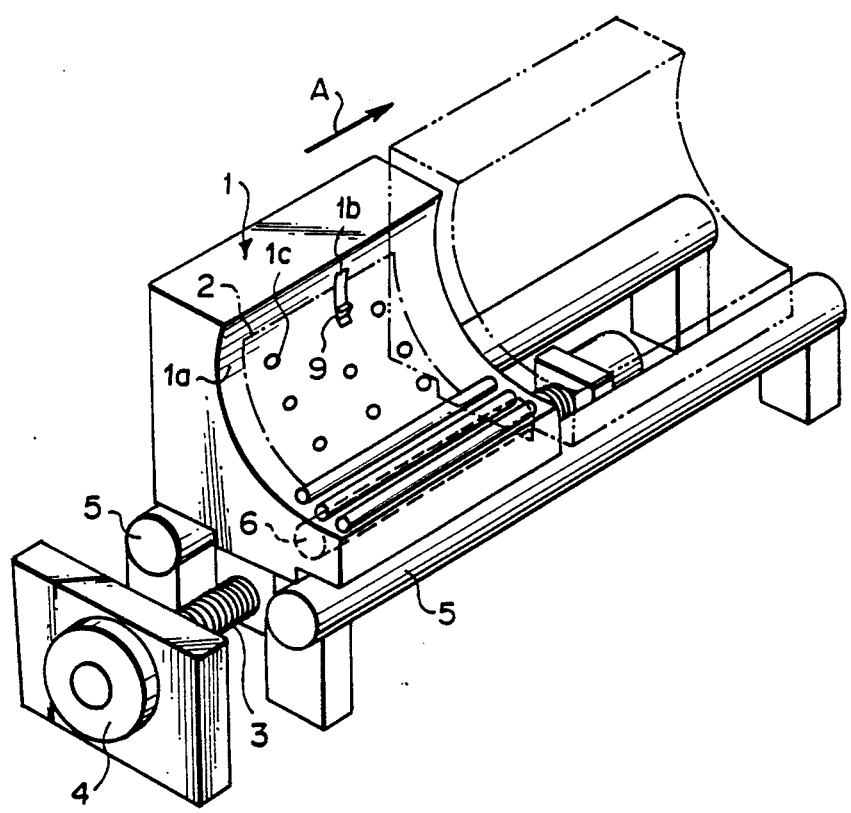
FIG. 1 is a perspective view showing an embodiment of the apparatus for loading a sheet-shaped material in accordance with the present invention.

With reference to FIG. 1, an embodiment of the apparatus for loading a sheet-shaped material in accordance with the present invention is constituted for use in a radiation image read-out apparatus. A stimulable phosphor sheet 2 carrying a radiation image stored thereon is held as indicated by the chain line on an inwardly concave cylindrical surface 1a of a sheet holding means 1. The lower end portion of the sheet holding means 1 is engaged with a screw rod 3 which is rotated by a motor 4 to move sheet holding means 1 at a predetermined speed in the direction as indicated by the arrow A along two guide rails 5, 5 between the position indicated by the solid line and the position indicated by the chain line.

Figure 2:
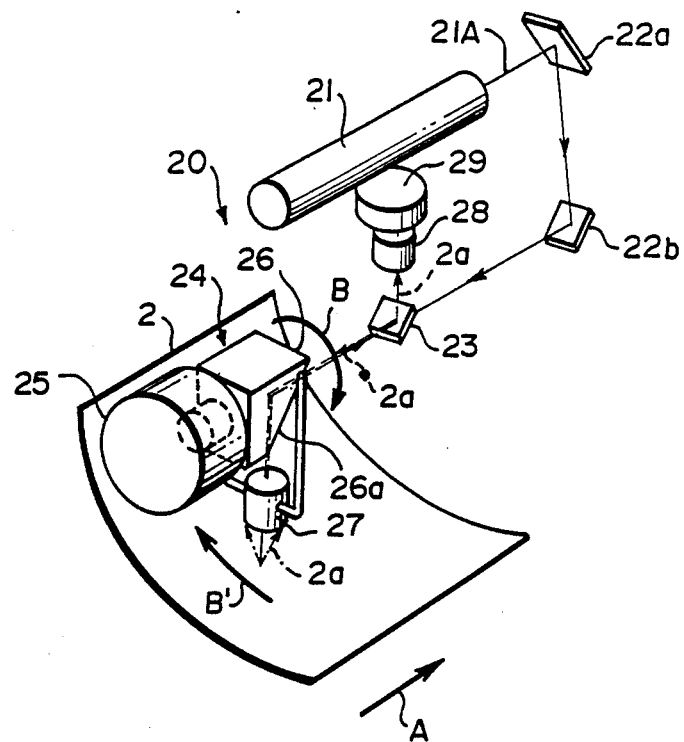
FIG. 2 is a perspective view showing the optical system provided above the apparatus for loading a sheet-shaped material shown in FIG. 1, FIGS. 3A, 3B and 3C are explanatory sectional side views showing the loading of the sheet-shaped material to the apparatus for loading a sheet-shaped material shown in FIG. 1.

A scanning optical system 20 as shown in FIG. 2 is provided above the sheet holding means 1, and an image stored on the stimulable phosphor sheet 2 is read out by the scanning optical system 20. With reference to FIG. 2, stimulating rays 21A produced by a stimulating ray source 21 are reflected by mirrors 22a and 22b to change the optical path, and then impinge upon a dichroic mirror 23 for transmitting light having a wavelength within the wavelength range of the stimulating rays 21A and reflecting light having a wavelength within the wavelength range of light emitted by the stimulable phosphor sheet 2 when the stimulable phosphor sheet 2 is stimulated by the stimulating rays 21A. The stimulating rays 21A passing through the dichroic mirror 23 impinge upon a spinner 24, and are reflected and deflected thereby. The spinner 24 continuously and quickly rotates a mirror 26 by a spindle motor 25 in the direction as indicated by the arrow B. The mirror 26 is provided with a reflection surface 26a inclined at an angle of 45° with respect to the incident stimulating rays 21A. A lens system 27 for converging the stimulating rays 21A incident as a collimated light to a spot having a desired diameter on the stimulable phosphor sheet 2 is provided in the optical path of the stimulating rays 21A reflected by the mirror 26. The lens system 27 is rotated together with the mirror 26. The stimulating rays 21A are reflected and deflected by the spinner 24 to scan the stimulable phosphor sheet 2 repeatedly in the main scanning direction as indicated by the arrow B'. At the same time, as mentioned above, the sheet holding means 1 is moved at the predetermined speed in the sub-scanning direction as indicated by the arrow A. Therefore, the stimulable phosphor sheet 2 is two-dimensionally scanned by the stimulating rays 21A.

As the stimulable phosphor sheet 2 is exposed to the stimulating rays 21A, the exposed portion of the stimulable phosphor sheet 2 emits light 2a in an amount proportional to the radiation energy stored on said portion. The light 2a is emitted as non-directional light by said exposed portion of the stimulable phosphor sheet 2, impinges upon the lens system 27, and is collimated thereby. Then, the emitted light 2a is reflected by the mirror 26 of the spinner 24 and by the dichroic mirror 23, and impinges upon a photomultiplier 29 provided as a photodetector in the optical path. Before impinging upon the photomultiplier 29, the emitted light 2a is converged by a converging lens system 28 so that it efficiently enters the photomultiplier 29. The photomultiplier 29 photoelectrically detects the emitted light 2a and generates electric read-out signals. The read-out signals are processed by an image processing circuit (not shown), fed to an image reproducing apparatus such as a CRT or a scanning recording apparatus, and used for reproducing the radiation image as a visible image on the CRT or as a hard copy.

Loading and unloading of the stimulable phosphor sheet 2 on the aforesaid embodiment will hereinbelow be described with reference to FIGS. 1 and 3.

Figure 3A:
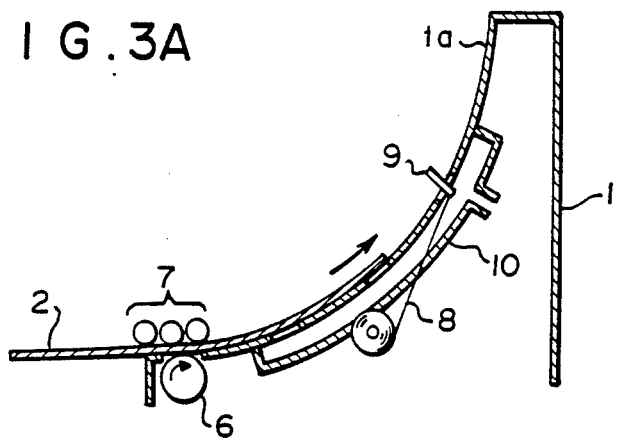
Figure 3B:
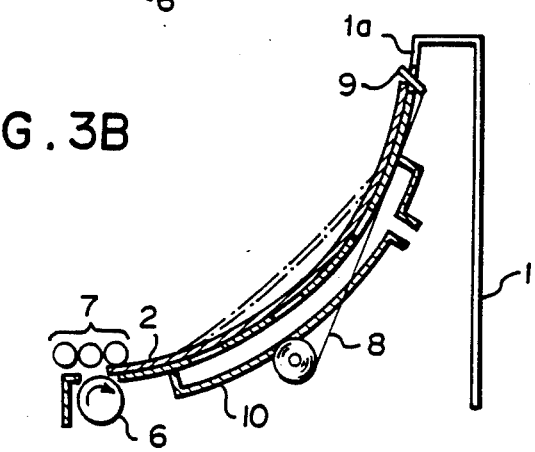

Conveyance of the stimulable phosphor sheet 2 to the sheet holding means 1 is carried out with the sheet holding means 1 located at its left end position indicated by the solid line in FIG. 1. A lower roller 6 and upper rollers 7, 7, 7 as a sheet conveyance means moveable together with the sheet holding means 1 are provided at the lower end portion of the sheet holding means 1. As shown in FIG. 3A, the stimulable phosphor sheet 2 is conveyed by the lower roller 6 and the upper rollers 7, 7, 7 from the lower end portion of the sheet holding means 1 along the cylindrical surface 1a. On the other hand, the sheet holding means 1 is provided with a claw 9 projecting to a position on the cylindrical surface 1a at which the leading edge of the stimulable phosphor sheet 2 conveyed by the sheet conveyance means contacts the claw 9. The claw 9 is connected with a constant-pressure spring 8. The claw 9 is moveable inside of a groove 1b, which is formed in the cylindrical surface 1a to extend in the direction of conveyance of the stimulable phosphor sheet 2, by expanding the constant-pressure spring 8. As shown in FIG. 3B, after the leading edge of the stimulable phosphor sheet 2 conveyed by the lower roller 6 and the upper rollers 7, 7, 7 along the cylindrical surface 1a contacts the claw 9, the stimulable phosphor sheet 2 pushes up the claw 9 and is conveyed by gradually moving up the claw 9 against the urging force received from the claw 9 expanding the constant-pressure spring 8. The stimulable phosphor sheet 2 is comparatively rigid. Therefore, in the case where the claw 9 is not provided and the stimulable phosphor sheet 2 is conveyed by a pair or rollers, the stimulable phosphor sheet 2 often separates from the cylindrical surface 1a as indicated by the chain line in FIG. 3B. However, with this embodiment, the stimulable phosphor sheet 2 receives the pushing force reverse to the direction of conveyance of the stimulable phosphor sheet 2 from the claw 9 during the conveyance. Therefore, the stimulable phosphor sheet 2 is bent along the cylindrical surface 1a, and is conveyed reliably along the cylindrical surface 1a. As the constant-pressure spring 8 connected with the claw 9, a spring having such a strength as to exert pushing force of an appropriate level to the stimulable phosphor sheet 2 and allow the conveyance of the stimulable phosphor sheet 2 is selected in accordance with the rigidity of the stimulable phosphor sheet 2 and the like.

Figure 3C:
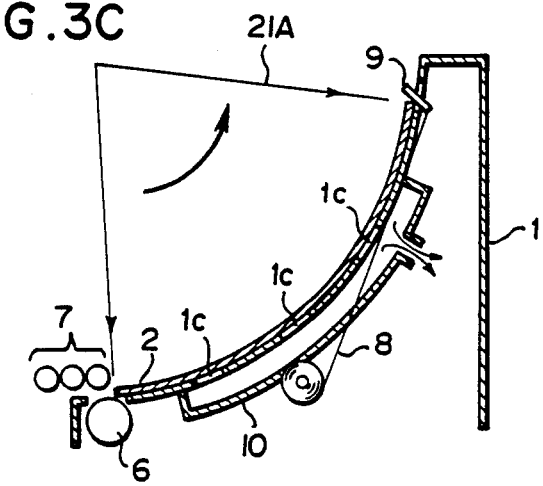

The stimulable phosphor sheet 2 conveyed by the upper rollers 7, 7, 7 and the lower roller 6 by pushing up the claw 9 in the manner as mentioned above is stopped at the position indicated by the solid line in FIG. 3B where the tailing edge of the stimulable phosphor sheet 2 is released from the grasping between the upper rollers 7, 7, 7 and the lower roller 6. This stop position coincides with the predetermined position on the cylindrical surface 1a. At the predetermined position, the stimulable phosphor sheet 2 is exposed to the stimulating rays 21A as mentioned above. The sheet holding means 1 is provided with a suction means for holding the stimulable phosphor sheet 2 by suction on the cylindrical surface 1a, and the stimulable phosphor sheet 2 is held on the cylindrical surface 1a prior to the scanning by the stimulating rays 21A. Specifically, the cylindrical surface 1a is provided with a plurality of suction holes 1c, 1c, . . . , and a suction box 10 having an upper face opened along the cylindrical surface 1a and provided with a suction means (not shown) such as an air pump is provided under the cylindrical surface 1a. The suction box 10 begins suction at the time the stimulable phosphor sheet 2 has been conveyed to the predetermined position, and holds the stimulable phosphor sheet 2 on the cylindrical surface 1a by the suction force through the suction holes 1c, 1c, . . . . Suction of the stimulable phosphor sheet 2 by the suction box 10 is effected with such a strength that the stimulable phosphor sheet 2 is reliably stopped at the predetermined position on the cylindrical surface 1a by the suction force alone and is not pushed back downward by the claw 9. As shown in FIG. 3C, after the suction of the stimulable phosphor sheet 2 is begun in this manner, the upper rollers 7, 7, 7 are moved leftward by a movement means (not shown) and retracted from the stimulable phosphor sheet 2, so that the stimulating rays 21A can impinge also upon the tailing edge of the stimulable phosphor sheet 2.

After the stimulable phosphor sheet 2 has been held by suction on the cylindrical surface 1a and retraction of the upper rollers 7, 7, 7 has been finished, the sheet holding means 1 is moved at a predetermined speed in the direction as indicated by the arrow A in FIG. 1, and the image read-out is carried out in the manner as mentioned above by use of the stimulating rays 21A.

At the time the image read-out is completed, the sheet holding means 1 has been moved to its right end position indicated by the chain line in FIG. 1. At this position, the stimulable phosphor sheet 2 from which the radiation image has been read out is taken out of the sheet holding means 1. Specifically, when the image read-out is finished, the upper rollers 7, 7, 7 are returned to the position facing the lower roller 6, and then the suction by the suction box 10 is stopped. As the suction is stopped, the stimulable phosphor sheet 2 is pushed back downward by the claw 9, and therefore the tailing edge of the stimulable phosphor sheet 2 readily enters between the upper rollers 7, 7, 7 and the lower roller 6. The upper rollers 7, 7, 7 and the lower roller 6 are rotated reversely to the directions of rotation at the time of the sheet conveyance onto the sheet holding means 1, and convey the stimulable phosphor sheet 2 out of the cylindrical surface 1a.

Figure 4:
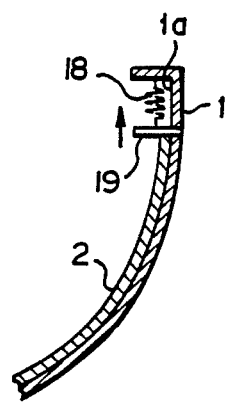
FIG. 4 is a schematic view showing the claw and the urging means in another embodiment of the apparatus for loading a sheet-shaped material in accordance with the present invention.

With the aforesaid embodiment wherein the claw 9 connected with the constant-pressure spring 8 is provided and the stimulable phosphor sheet 2 is conveyed onto the sheet holding means 1 by pushing the claw 9 and expanding the spring 8, the stimulable phosphor sheet 2 can be prevented from separating from the cylindrical surface 1a and can be fed and held reliably along the cylindrical surface 1a by means of the pushing force of the claw 9. The urging means connected with the claw may be of any configuration and layout insofar as the claw can exert urging force in the direction pushing back the stimulable phosphor sheet 2 when the claw is moved by the leading edge of the stimulable phosphor sheet 2. For example, as shown in FIG. 4, a claw 19 may be provided slideably along the cylindrical surface 1a of the sheet holding means 1, and an urging means may be composed of a spring 18 connected with the claw 19 and contracted as the claw 19 is moved in the direction as indicated by the arrow.

Also, with the aforesaid embodiment wherein the sheet holding means 1 is provided with the suction means, the stimulable phosphor sheet 2 can be held more reliably, the image read-out can be carried out reliably even though vibration is given to some extent to the apparatus, and the image read-out can be carried out from the tailing edge of the stimulable phosphor sheet 2 by retracting the upper rollers 7, 7, 7 from the stimulable phosphor sheet 2 at the time of the image read-out. The suction means need not necessarily be provided in the case where the tailing edge of the stimulable phosphor sheet 2 need not be subjected to the image read-out and the stimulable phosphor sheet 2 is held reliably on the cylindrical surface 1a by the upper rollers 7, 7, 7, the lower roller 6 and the claw 9.

On the other hand, in the aforesaid embodiments, during the image read-out, the claw 9 (or 19) pushes the leading edge of the stimulable phosphor sheet 2, and the lower roller 6 contacts the tailing edge of the stimulable phosphor sheet 2. Therefore, during the image read-out, there is the risk of the stimulable phosphor sheet 2 being slightly separated from the cylindrical surface 1a by the claw 9 (or 19) and the lower roller 6. It was found that, in the aforesaid scanning optical system 20, the amount of the emitted light 2a guided by the lens system 27 decreases by several percent when the distance between the stimulable phosphor sheet 2 and the lens system 27 is changed by several tens of microns. Therefore, it is desirable that the claw 9 (or 19) and the lower roller 6 having the risk of separating the stimulable phosphor sheet 2 from the cylindrical surface 1a be retracted to positions not contacting the stimulable phosphor sheet 2 at the time of the image read out. A further embodiment of the apparatus for loading a sheet-shaped material in accordance with the present invention wherein the sheet holding means is provided with a mechanism for retracting the upper rollers 7, 7, 7 from the stimulable phosphor sheet 2 as mentioned above and moving the lower roller 6 and the claw to positions not contacting the stimulable phosphor sheet 2 at the time of the image read-out will hereinbelow be described with reference to FIGS. 5 and 6.

Figure 5:
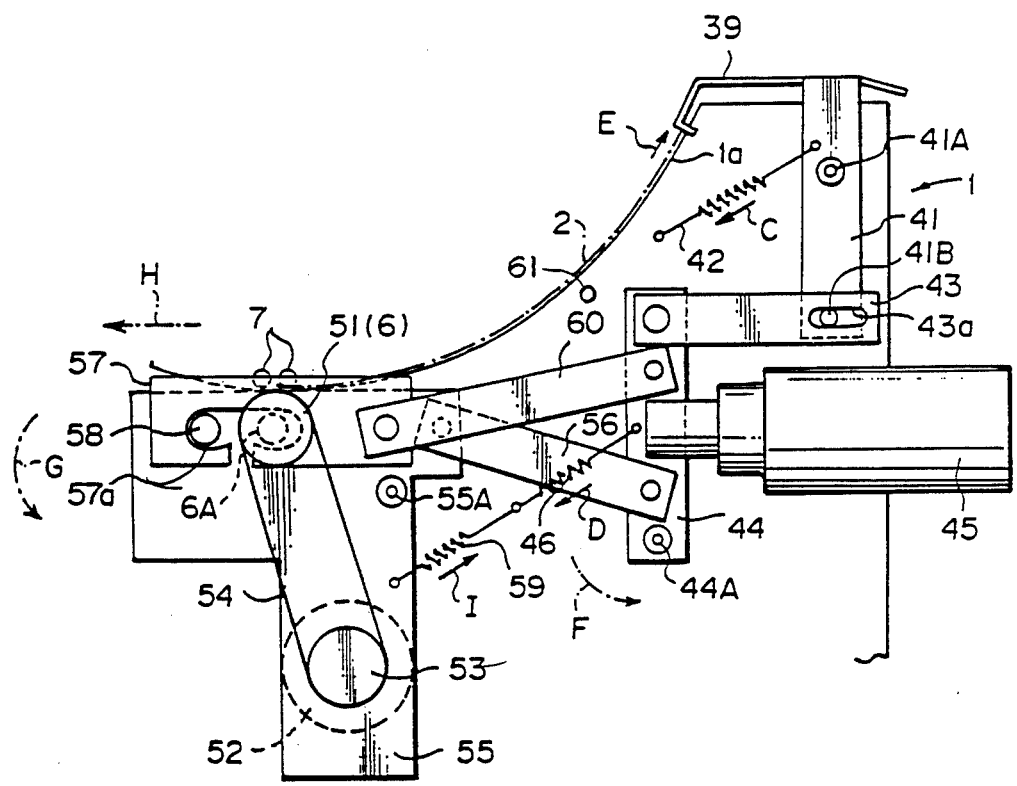
FIG. 5 is a schematic view showing the sheet holding means in a further embodiment of the apparatus for loading a sheet-shaped material in accordance with the present invention.
Figure 6:
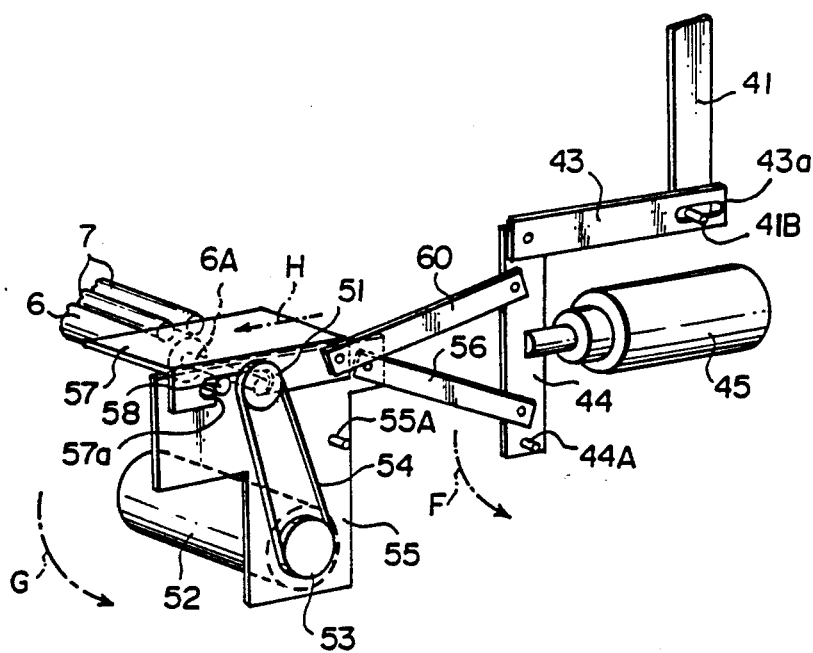
FIG. 6 is a perspective view showing the major part of the sheet holding means shown in FIG. 5.

With reference to FIG. 5, the sheet holding means 1 is provided with a claw 39 for holding the leading edge of the stimulable phosphor sheet 2. The claw 39 is secured to an upper edge of a claw support plate 41 which is urged by a spring 42 in the direction as indicated by the arrow C and which is rotatable around a rotation shaft 41A. The claw support plate 41 is coupled with a first coupling plate 43 with an engagement shaft 41B provided at the lower end portion of the claw support plate 41 being engaged with a long hole 43a of the first coupling plate 43. The first coupling plate 43 is coupled with a second coupling plate 44 which is connected with a solenoid 45 and rotatable around a rotation shaft 44A. The second coupling plate 44 is urged by a spring 46 in the direction as indicated by the arrow D, and the solenoid 45 normally maintains the second coupling plate 44 at the position shown against the urging force of the spring 46.

Before the stimulable phosphor sheet 2 is conveyed onto the cylindrical surface 1a, the claw 39 is maintained by the urging force of the spring 42 at a position lower than the position shown in FIG. 5 on the cylindrical surface 1a. When the stimulable phosphor sheet 2 is conveyed along the cylindrical surface 1a by the lower roller 6 and the upper rollers 7, 7, the leading edge of the stimulable phosphor sheet 2 gradually pushes up the claw 39 in the direction as indicated by the arrow E against the urging force of the spring 42.

When the stimulable phosphor sheet 2 has been located at the predetermined position on the cylindrical surface 1a as shown in FIG. 5 and the image read-out is carried out, the solenoid 45 stops pulling of the second coupling plate 44 rightward in FIG. 5. As a result, the second coupling plate 44 is rotated in the direction as indicated by the arrow F around the rotation shaft 44A until it abuts on a stopper 61 by being urged by the spring 46 in the direction as indicated by the arrow D. The rotation of the second coupling plate 44 is transmitted to the claw support plate 41 via the first coupling plate 43, and the claw support plate 41 is thus rotated clockwise. Therefore, the claw 39 secured to the claw support plate 41 is moved up, and the stimulable phosphor sheet 2 is released from the push-down force of the claw 39. On the other hand, as the second coupling plate 44 is rotated in the direction as indicated by the arrow F, the upper rollers 7, 7 are moved leftward and retracted from the stimulable phosphor sheet 2, and the lower roller 6 is moved down to a position not contacting the stimulable phosphor sheet 2. The movements of the upper rollers 7, 7 and the lower roller 6 will hereinbelow be described with reference to FIG. 6.

A gear 51 is secured to a rotation shaft 6A of the lower roller 6 and coupled with a gear 53 rotated by a motor 52 via a belt 54, thereby to transmit the rotation force of the motor 52 to the lower roller 6. The rotation shaft 6A is provided through a lower roller support plate 55 via a bearing (not shown). The lower roller support plate 55 is urged by a spring 59 shown in FIG. 5 in the direction as indicated by the arrow I and is rotatable around a rotation shaft 55A. The lower roller support plate 55 supports one end portion of a third coupling plate 56 having the other end portion supported by the second coupling plate 44. On the other hand, the upper rollers 7, 7 are supported by an upper roller support plate 57 which has an L-shaped cross-section and which is provided with a long hole 57a for engaging with the rotation shaft 6A and a guide pin 58 secured to the lower roller support plate 55. Also, the upper roller support plate 57 supports one end portion of a fourth coupling plate 60 having the other end portion supported by the second coupling plate 44.

When the second coupling plate 44 is rotated in the direction as indicated by the arrow F as mentioned above, the rotation force is transmitted to the lower roller support plate 55 via the third coupling plate 56, and causes the lower roller support plate 55 to rotate in the direction as indicated by the arrow G around the rotation shaft 55A by the urging force of the spring 59. Therefore, the lower roller 6 is moved together with the lower roller support plate 55 in the direction as indicated by the arrow G and thus is retracted to a lower position on the cylindrical surface 1a at which the lower roller 6 does not contact the stimulable phosphor sheet 2. Also, the rotation force of the second coupling plate 44 in the direction as indicated by the arrow F is transmitted to the upper roller support plate 57 via the fourth coupling plate 60, thereby to move the upper roller support plate 57 in the direction as indicated by the arrow H. Accordingly, the upper rollers 7, 7 are moved together with the upper roller support plate 57 in the direction as indicated by the arrow H, and are thus retracted leftward from the stimulable phosphor sheet 2. At the time the image read-out from the stimulable phosphor sheet 2 is finished and the stimulable phosphor sheet 2 is to be conveyed out of the cylindrical surface 1a, the solenoid 45 is activated to rotate the second coupling plate 44 clockwise, thereby to return the claw 39, the upper rollers 7, 7 and the lower roller 6 to their positions shown in FIG. 5.

In the aforesaid embodiments, the sheet conveyance means for conveying the stimulable phosphor sheet 2 along the cylindrical surface 1a need not necessarily be composed of the pair of rollers insofar as the sheet conveyance means can convey the stimulable phosphor sheet 2 by grasping the stimulable phosphor sheet 2 from above and below thereof. For example, one of the upper rollers 7, 7, 7 (or the upper rollers 7, 7) and the lower roller 6 may be replaced by an endless belt or the like.

The sheet-shaped material is not limited to the stimulable phosphor sheet 2, and may be of any type made of a material which is comparatively rigid and suitable for being conveyed by pushing the claw. Also, the apparatus for loading a sheet-shaped material in accordance with the present invention is also applicable to scanning apparatuses different from the radiation image read-out apparatus, and to other apparatuses wherein a sheet-shaped material should be held on a curved surface. The curved surface of the sheet holding means 1 is not limited to the cylindrical surface, and may be any type insofar as the curved surface is inwardly concave.

I claim:

1. An apparatus for loading a sheet-shaped material, which comprises:
    (i) a sheet holding means capable of holding a sheet-shaped material at a predetermined position on an inwardly concave curved surface,
    (ii) a sheet conveyance means provided at an end portion of said sheet holding means for grasping said sheet-shaped material and conveying it to said predetermined position along said curved surface of said sheet holding means, and
    (iii) a claw connected with an urging means, projected to a position on said curved surface at which a leading edge of said sheet-shaped material conveyed by said sheet conveyance means contacts said claw, and moveable on said curved surface against urging force of said urging means as the leading edge of said sheet-shaped material contacts said claw.

2. An apparatus as defined in claim 1 wherein said sheet holding means is provided with a suction means for holding said sheet-shaped material by suction on said curved surface.

3. An apparatus as defined in claim 1 wherein said sheet-shaped material is a stimulable phosphor sheet.

* * * * *